(12) United States Patent
Emoff et al.

(10) Patent No.: US 6,364,099 B2
(45) Date of Patent: **\*Apr. 2, 2002**

(54) COUPON DISPENSER ASSEMBLY AND SHROUD

(76) Inventors: Michael J. Emoff, 5450 Sherfield Dr., Trotwood, OH (US) 45426; Mary Jayne Miller, 529 Cottingwood Ct., Kettering, OH (US) 45429

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/468,520
(22) Filed: Dec. 21, 1999
(51) Int. Cl.$^7$ ................................................ A45C 11/18
(52) U.S. Cl. ..................... 206/39.3; 206/39.6; 206/831; 52/3
(58) Field of Search ................... 206/37–39, 39.5–39.8, 206/831, 320; 220/23.83, 23.87; 150/154, 165; 52/3, 4, 19, 23, 24, 36.2, 173.1, 173.3; 221/45, 56

(56) References Cited

U.S. PATENT DOCUMENTS

| 2,731,999 | A | * | 1/1956 | Burns ........................ 150/154 |
| 5,325,970 | A | * | 7/1994 | Dillon et al. ............... 206/320 |
| 5,943,826 | A | * | 8/1999 | Totin .......................... 52/24 |
| 5,944,219 | A | | 8/1999 | Emoff et al. |
| 5,979,699 | A | | 11/1999 | Simpson |
| 6,053,356 | A | * | 4/2000 | Emoff et al. .............. 206/39.5 |

FOREIGN PATENT DOCUMENTS

GB      1235110    * 6/1971 ................. 150/154

\* cited by examiner

*Primary Examiner*—Laun K. Bui
(74) *Attorney, Agent, or Firm*—Roger S. Dybvig

(57) ABSTRACT

A coupon dispenser assembly includes a disposable coupon dispenser and a protective shroud which is reusable with other similar coupon dispensers.

23 Claims, 7 Drawing Sheets

COUPON DISPENSER ASSEMBLY AND SHROUD

INCORPORATION BY REFERENCE

The disclosure of U.S. Pat. No. 5,944,219, granted Aug. 31, 1999, is hereby incorporated by reference herein.

FIELD OF THE INVENTION

This invention relates to a coupon dispenser assembly for dispensing paper coupons or similar sheets of paper and especially to a coupon dispenser assembly suitable for outdoor use. Definition: as used in this description and the claims that follow, the term "coupon" for convenience refers broadly to a sheet of paper or paper-like material which is printed to serve ony one of a wide variety of different purposes, such as a redeemable coupon, an inquiry form or an informational sheet.

BACKGROUND OF THE INVENTION

U.S. Pat. No. 5,944,219, discloses a pop-up coupon dispenser having a coupon-filled box having a slot through which coupons may be removed from the box. Such boxes can be made from stiff paper or cardboard and are intended primarily for use inside a building, such as a supermarket. Various ways can be used to mount the dispensers on a wire rack, shelf or other location. A preferred mounting arrangement disclosed in U.S. Pat. No. 5,944,219 includes a plastic cable tie which is extended through a pair of holes in the wall of the box opposite the slot through which the coupons are removed. A cable tie is easy to use and easy to sever to permit removal of the dispenser. The dispensers disclosed in U.S. Pat. No. 5,944,219 are so inexpensive in addition to being easy to mount and remove that they are considered to be disposable.

There are occasions in which coupon dispensers can advantageously be used outdoors in areas that are not completely protected from dew or rain or other precipitation. For example, coupon dispensers could be used on the tops of gas pumps or on fast food drive through windows. Because disposable dispensers of the type shown in U.S. Pat. No. 5,944,219 have housings typically made from paper or cardboard and dispense paper coupons, they are not suitable for outdoor use.

SUMMARY OF THE INVENTION

An object of this invention is to provide an inexpensive coupon dispenser assembly suitable for outdoor use.

Another object of this invention is to provide an inexpensive coupon dispenser assembly suitable for outdoor use which utilizes a disposable component and a reusable component.

Still another object of this invention is to provide a reusable shroud for disposable coupon dispensers which protects the dispensers from dew or precipitation such as rain or snow.

A coupon dispenser assembly in accordance with this invention comprises a coupon dispenser and a water-proof protective shroud that protects the coupon dispenser from getting water soaked because of dew or other precipitation. (The term "water-proof" is used herein to mean substantially water-impermeable.) The coupon dispenser is preferably inexpensive and disposable in the sense of the dispensers shown in U.S. Pat. No. 5,944,219.

The dispenser and the shroud are preferably connected together by the mounting means by which the dispenser box can be mounted on a wire rack, shelf or other support. The preferred form of mounting means is a plastic cable tie that extends from the rear end of the dispenser box. When a cable tie is used, the shroud is provided with a rear panel that is apertured to permit one leg of the cable tie to be extended therethrough. Accordingly, when the dispenser box is connected to a support by the cable tie, the shroud will also be connected to the support. In a modification, the shroud is provided with an additional pair of apertures which may be used to attach suction cups to the shroud by which the shroud may be mounted on a flat surface. In use of the modification, the dispenser box is also connected to the shroud by means of the cable tie. Therefore, an empty dispenser box may be removed from the shroud by cutting the cable tie and then replaced by a fresh dispenser box.

Shrouds of this invention can take many different forms. The presently preferred shroud comprises a box-like structure having a self-supporting shape of a size to snugly receive the dispenser housing and to cover the top and sides of the dispenser housing. The preferred shroud is formed from thin-walled plastic panels including a top panel, a pair of side panels, a front panel and a rear panel. The front panel has an open window that provides access to the coupons in the dispenser. A brim or hood at the front end of the shroud extends forwardly, upwardly, and outwardly from the front panel to provide additional protection for the front wall of the dispenser and the coupons exposed therethrough. Because dispensers of the type shown in U.S. Pat. No. 5,944,219 usually have advertising material printed thereon, the shroud is preferably sufficiently transparent that the advertising material is clearly visible therethrough. Shrouds of this invention can be molded or fabricated in one piece from any suitable plastic material, such as a transparent polycarbonate material.

Other objects and advantages will become apparent from the drawings and the following description.

DETAILED DESCRIPTION

Figure 1:
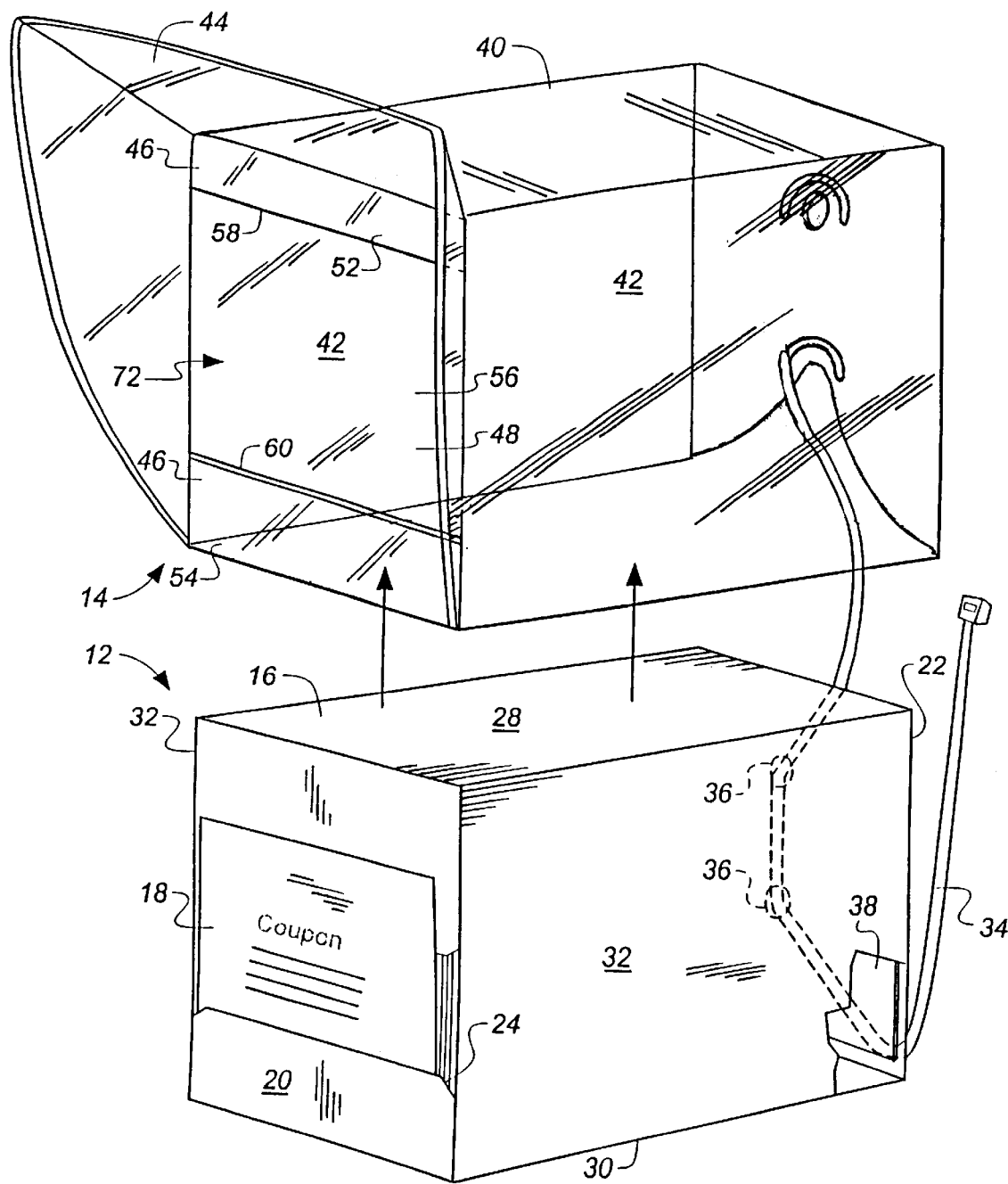
FIG. 1 is an exploded isometric view of a coupon dispenser assembly of this invention that includes a coupon dispenser and a protective shroud.
Figure 2:
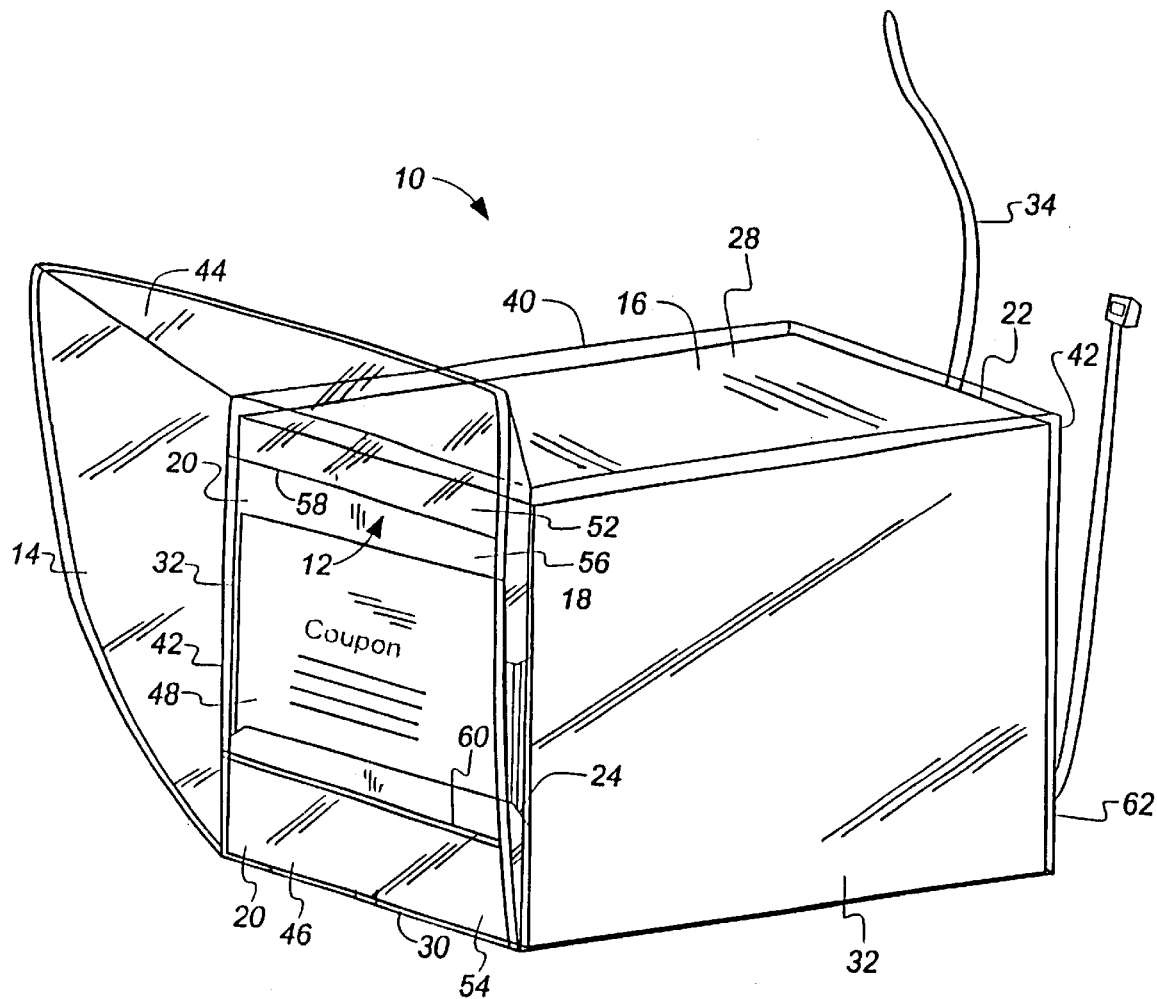
FIG. 2 is an isometric view of the coupon dispenser assembly of FIG. 1 shown fully assembled.
Figure 3:
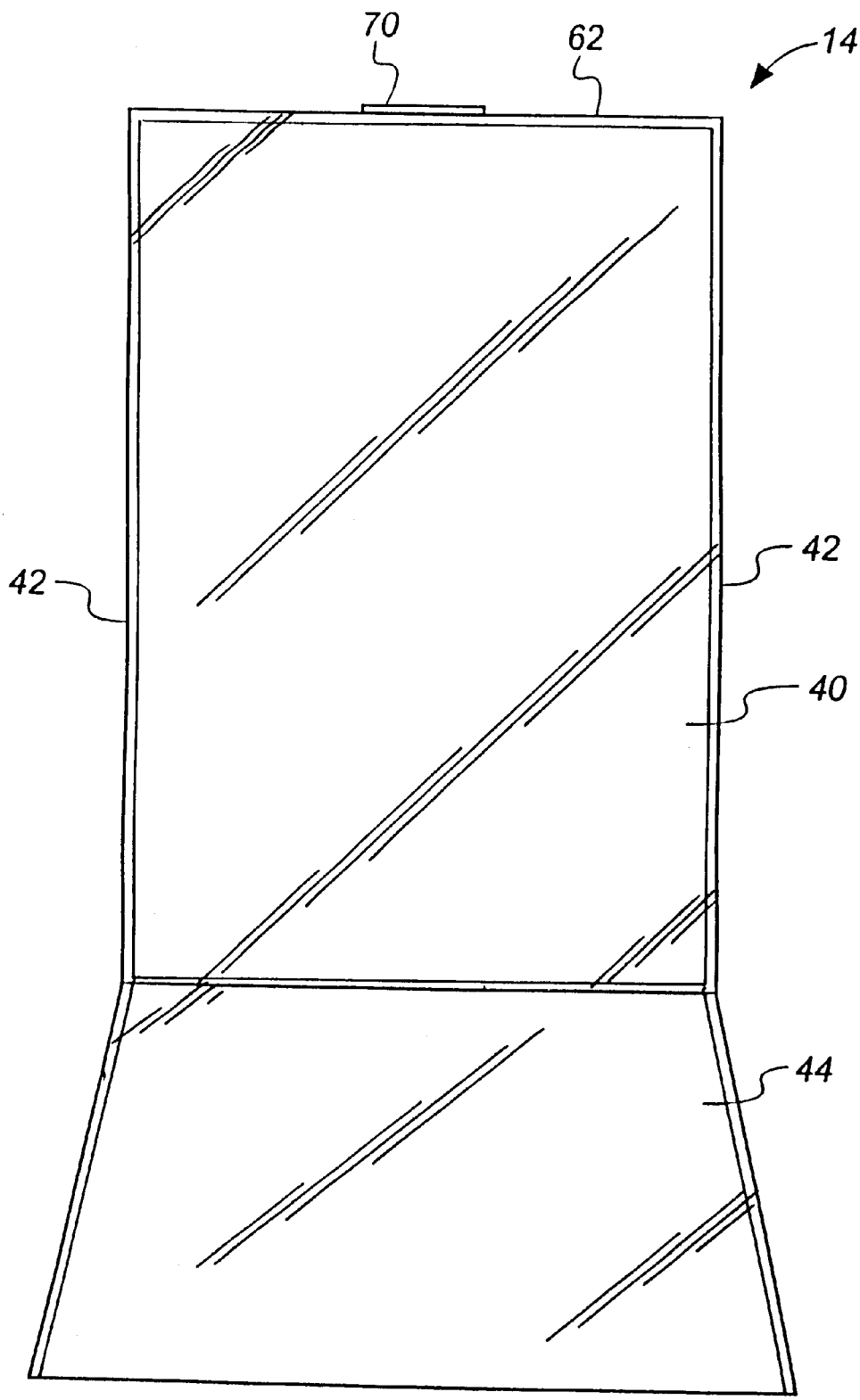
FIG. 3 is a top plan view of the protective shroud of FIGS. 1 and 2.
Figure 4:
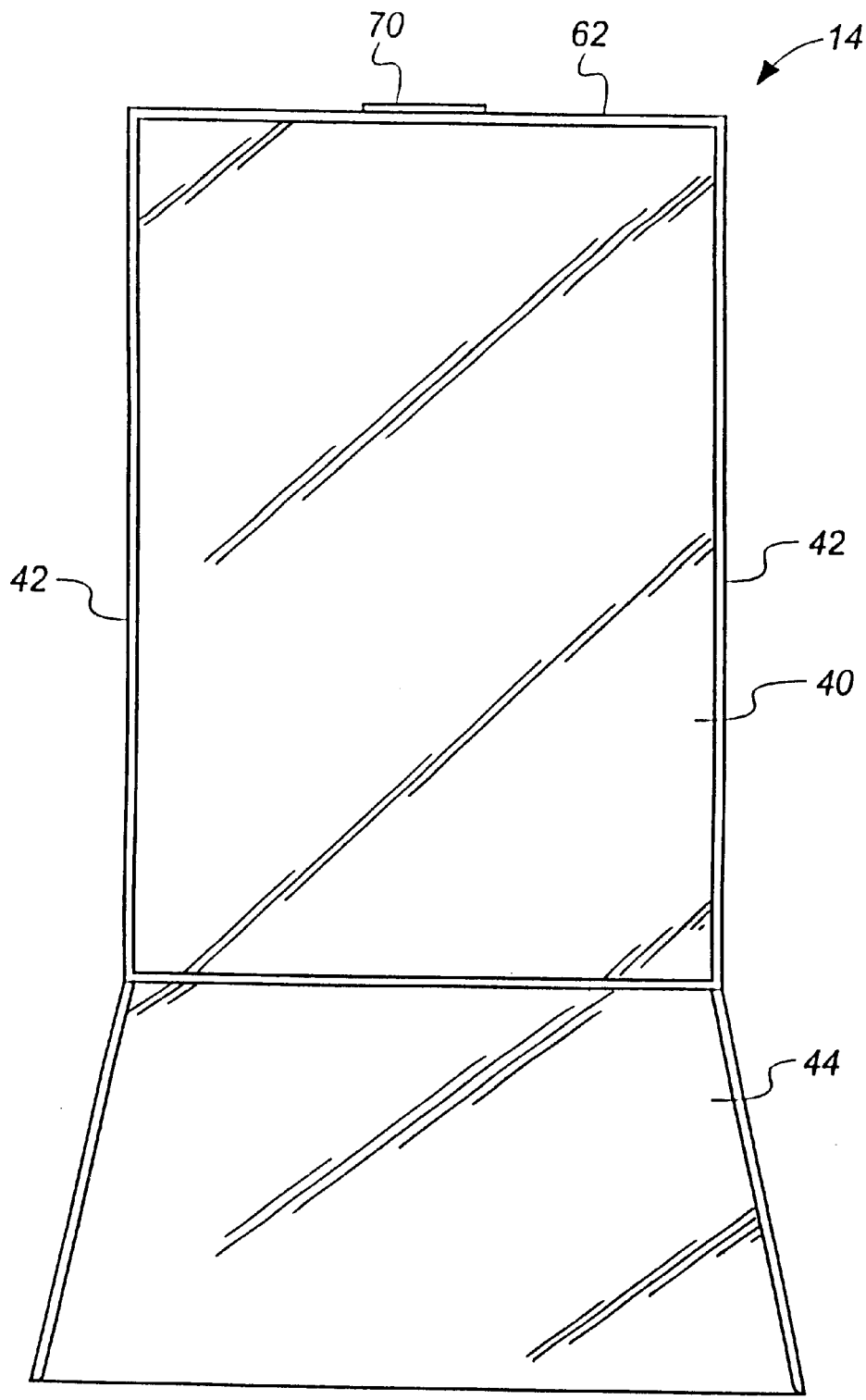
FIG. 4 is a bottom plan view of the shroud.
Figure 5:
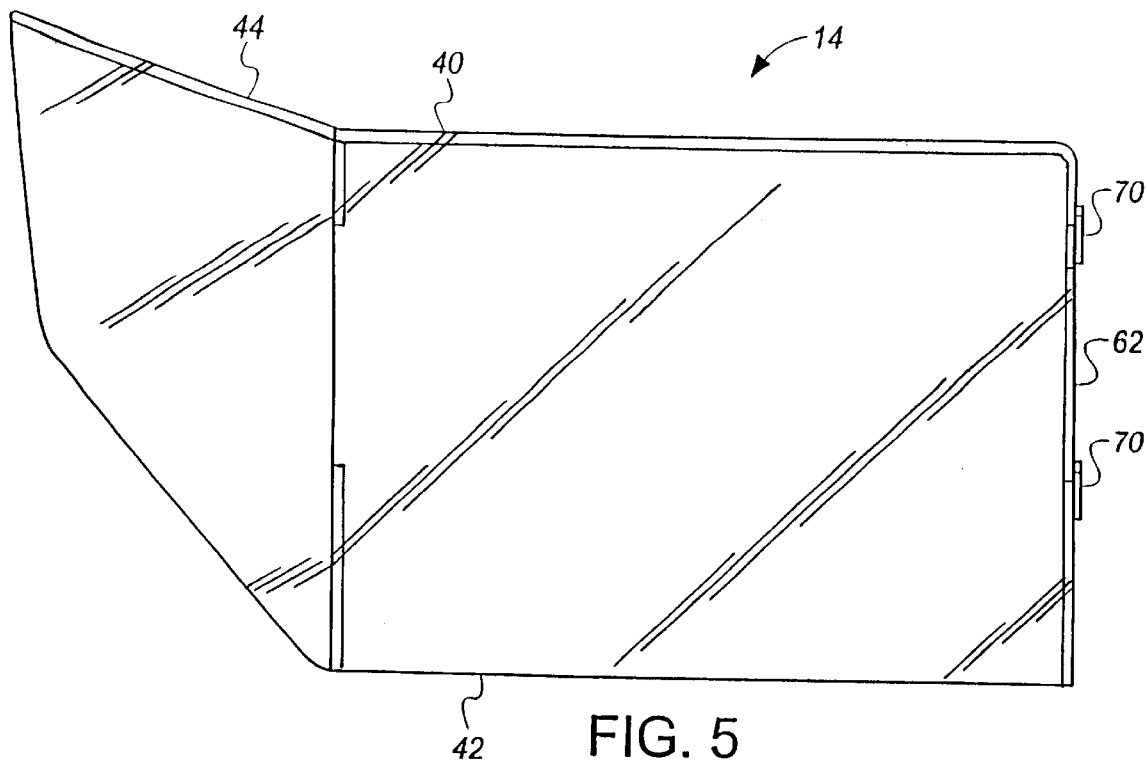
FIG. 5 is a side elevational view of the shroud.
Figure 6:
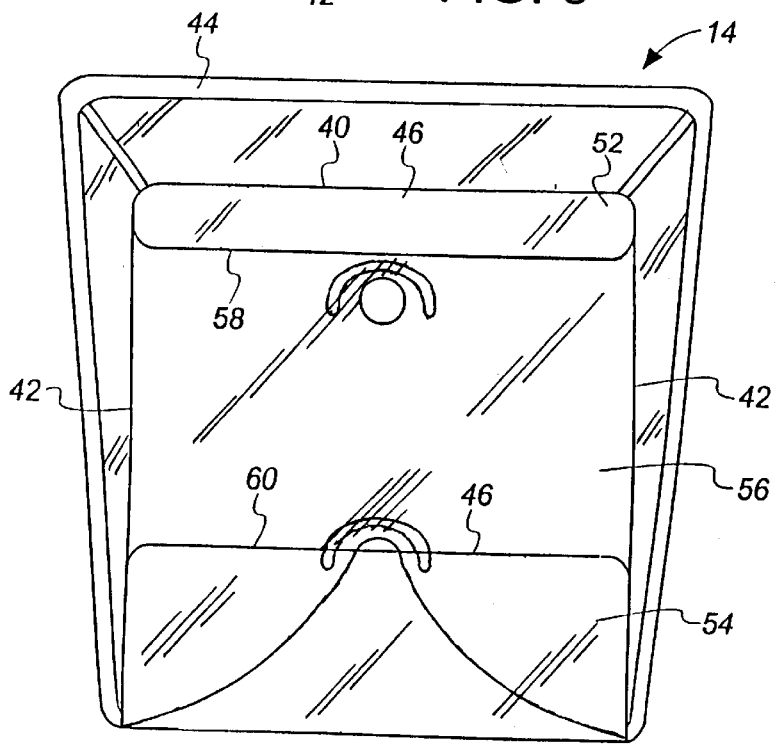
FIG. 6 is a front elevational view of the shroud.

As illustrated in FIGS. 1 and 2, a coupon dispenser assembly, generally designated 10, in accordance with this invention comprises a coupon dispenser 12 and a protective shroud 14. In the preferred practice of this invention, the coupon dispenser 12 is disposable and the protective shroud 14 is reusable with other similar coupon dispensers.

The coupon dispenser 12 preferably comprises a box 16 which houses a stack of coupons 18, the box 16 having a front wall 20 at its front end and a rear wall 22 at its rear end. The front wall 20 has a slot 24 that provides access to the coupons 18 to enable manual removal of the coupons 18. A top wall 28 and a bottom wall 30 are joined along connecting edges to the front wall 20 and the rear wall 22. A pair of sidewalls 32 are joined along mating edges to the other walls 20, 22, 28 and 30. In addition, the dispenser 12 comprises a mounting member extending from the rear end of the box 16. In the preferred embodiment illustrated in the drawings, the mounting member comprises a plastic cable tie 34 which extends through a pair of aligned openings 36 in the rear wall 22 and a stiffening plate 38 adhered to the inside of the rear wall 22. The dispenser 12 is inexpensive, easy to install and easy to remove. It also has ample surface area on its outer surfaces for advertising. The dispenser box 16 is made from cardboard or stiff paper material which is not sufficiently water-proof to be used outdoors during inclement weather. (As used in the this specification and the claims that follow, the term cardboard is used in a generic sense and includes paper board, card stock and coated and uncoated paper or paper-like materials.) Here it may be noted that this invention is applicable to other types of coupon dispensers, since this invention is directed to the combination of a dispenser and a shroud and also to the shroud itself. The details of the dispenser are unimportant in relation to the broader aspects of this invention.

Referring now to FIGS. 1 through 7, the protective shroud 14 has a self-supporting shape and comprises a top panel 40 covering the top wall of the box 16, and a pair of side panels 42 joined to the top panel 40 along respective opposite edges thereof in covering relation to the dispenser box sidewalls 32. The shroud 14 further comprises a brim or hood 44 projecting forwardly, upwardly and outwardly from the front end of the top panel 40. In the specific embodiment illustrated in the drawings, the brim 44 projects forwardly and upwardly from the top 40 panel and forwardly and outwardly from the front ends of the side panels 42. A shroud front panel 46 covers the front wall 20 of the box 16, the front panel 46 having an opening 48 that exposes the coupon-access 24 slot so that coupons 18 can be removed from the box 16 through the opening 48. The front panel 46 comprises two, mutually separate panel sections, namely an upper panel section 52 and a lower panel section 54. As evident, the upper panel section 52 is joined along mating margins to the shroud top panel 40 and to the shroud side panels 42, whereas the lower panel section 54 is joined along mating margins to the shroud side panels 42. A window 56 for accessing the coupons 18 is formed by and between mutually confronting edges 58 and 60, respectively, of the upper panel 52 and the lower panel 54. Window 56 is aligned with the front wall slot 24 to enable an individual to remove a coupon 18 from the dispenser box 16.

Figure 7:
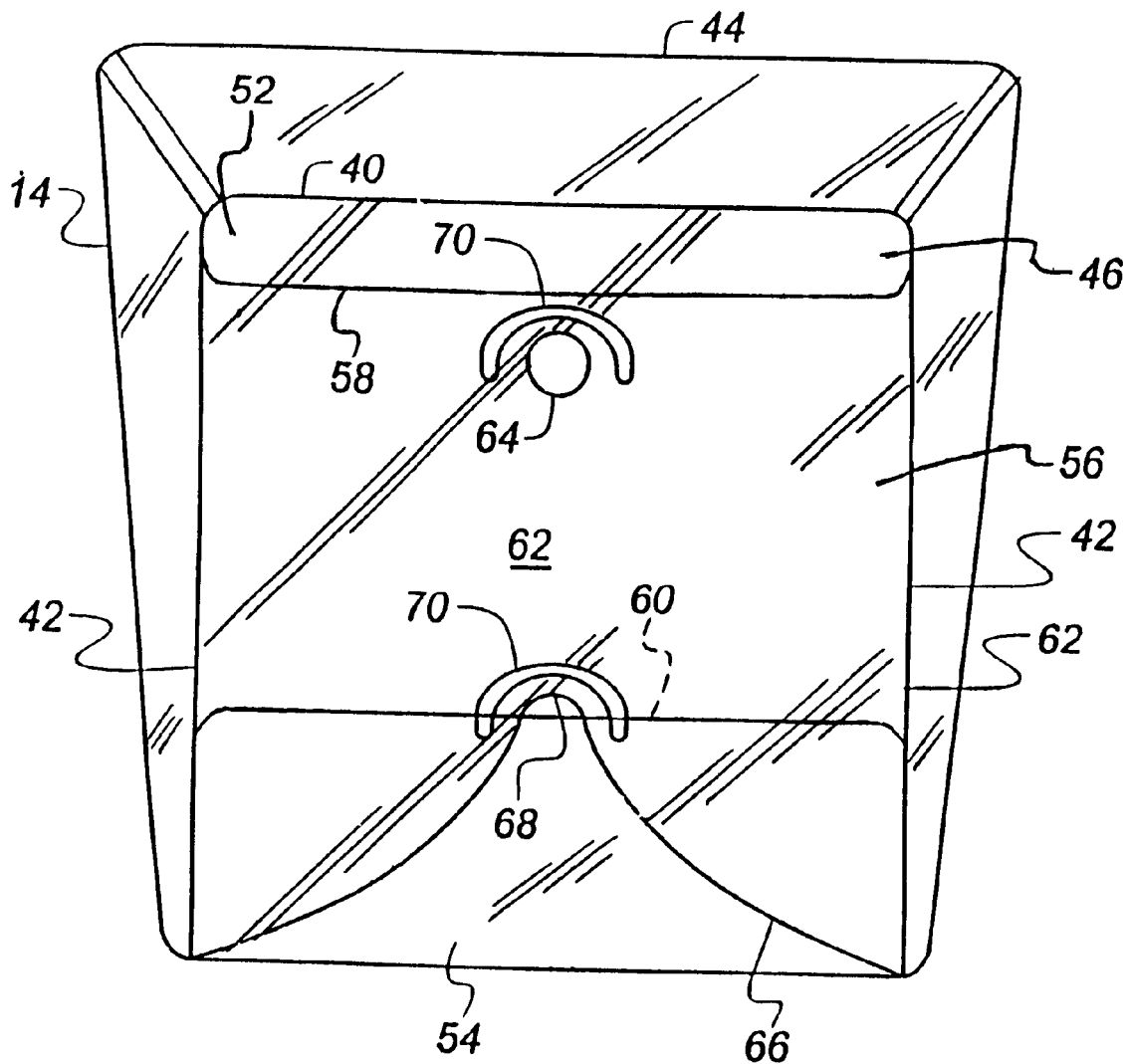
FIG. 7 is a rear elevational view of the shroud.

With reference to FIGS. 2 and 7, the shroud has a rear panel 62 having top and side edges joined, respectively, to the top panel 40 and the side panels 42. An aperture 64 in the rear panel 62 is aligned with uppermost of the two openings 36 in the rear wall 22 and the stiffening plate 38 of the dispenser box 16. The lower edge, designated 66, of the rear panel 62 has the shape of an inverted "V" having outwardly-flared sides. A bight 68 is formed at the center of the lower edge 66 of the rear panel 62, the bight 68 being axially aligned with the lower one of the two openings 36 in the rear wall 22 and the stiffening plate 38. A pair of arcuate shields 70 project rearwardly from the rear panel 62. The shields 70 are above the aperture 64 and the bight 68 to divert condensates which may be moving down the rear surface of the rear panel 62 to protect against water entering the dispenser box through the openings 36.

The bottom of the shroud 14 is open so that the free end of the upper leg of the cable tie 34 can be inserted through the aperture 64 in the rear panel 62 and the dispenser box 16 inserted into the shroud 14 from below the shroud 14. The inside surfaces of the top panel 40 and the side panels 42 of the shroud 14 are substantially coextensive with the corresponding top wall 28 and sidewalls 32 of the dispenser box 16 and the dispenser box is snugly received within the dispenser-receiving cavity, designated 72, bounded by the top, side, front and rear panels of the shroud 14. After the dispenser 12 is mounted in the shroud 14, the dispenser assembly 10 can be connected to, for example, a wire rack (not shown) by means of the cable tie 34. During this procedure, the lower end of the cable tie 34 will slide along the cam surfaces formed by the outwardly flared legs of the lower, inverted V-shaped edge 66 of the shroud rear panel 62.

When a dispenser box 12 is empty or otherwise not useful, it can be disconnected from the shroud 14 by cutting the cable tie 34 free from the wire rack or other support, and then replaced by a new dispenser box 12.

Figure 8:
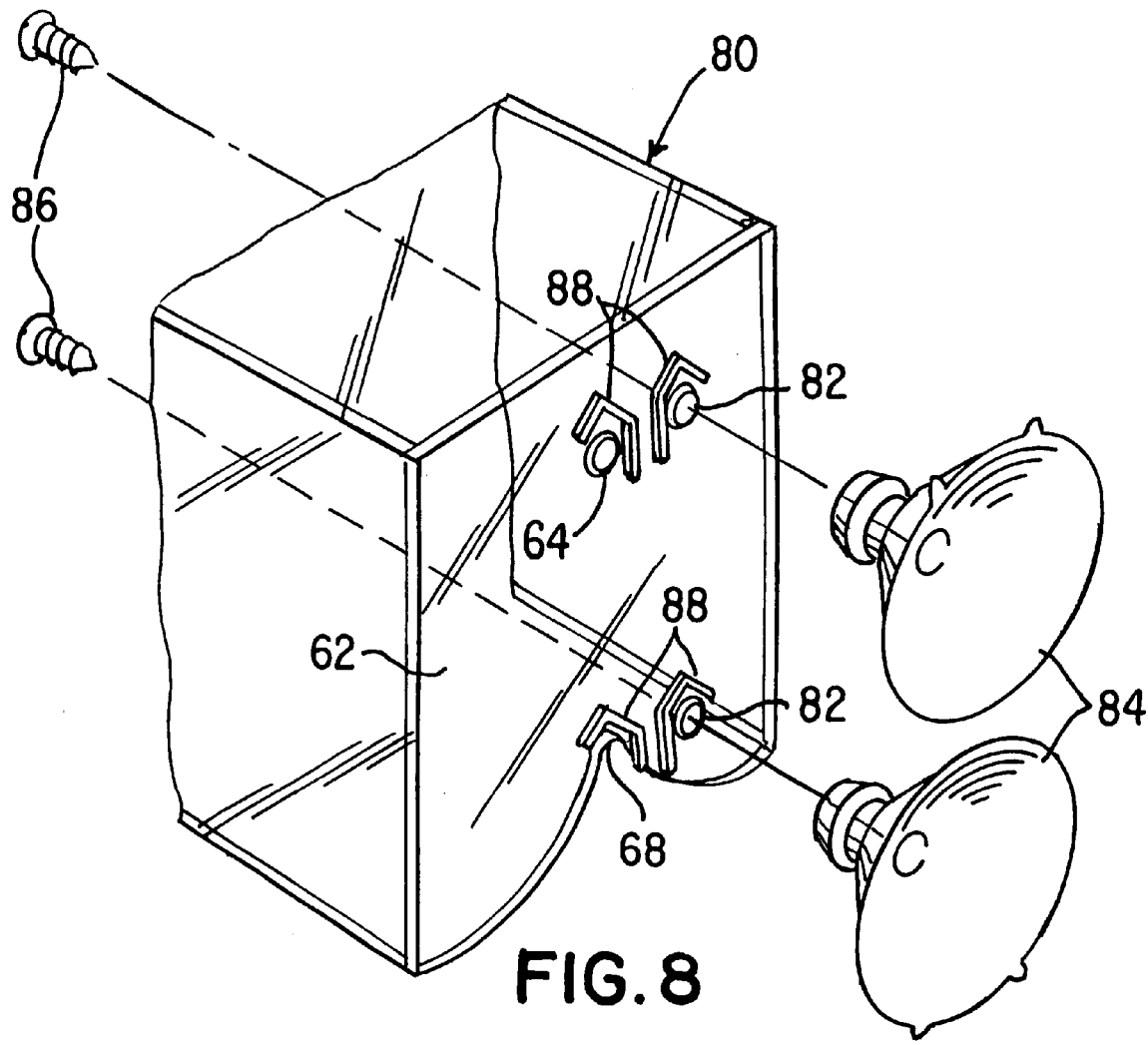
FIG. 8 is an exploded, fragmentary, isometric view of a portion of a second embodiment of a protective shroud in accordance with this invention.
Figure 9:
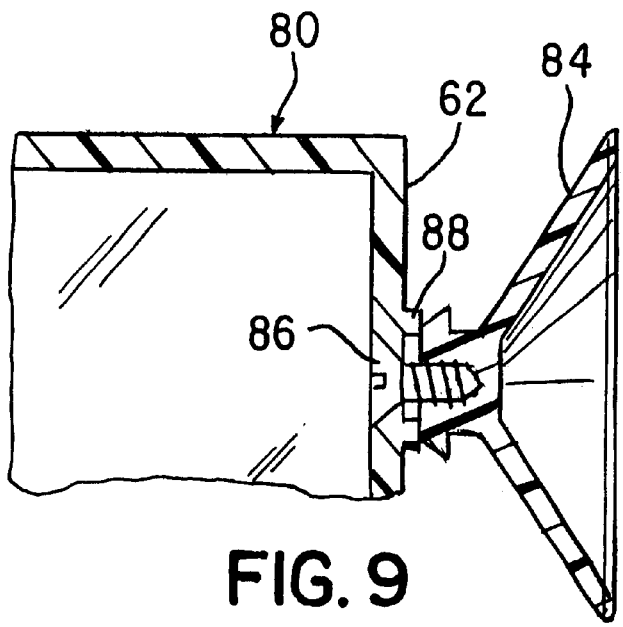
FIG. 9 is an enlarged, fragmentary, cross-sectional view of a portion of the protective shroud of FIG. 8.

In a modification shown in FIGS. 8 and 9, a second embodiment of a protective shroud, generally designated 80, is illustrated which is identical to the shroud 14 of FIGS. 1 through 7, except that the shroud 80 has, in addition to the aperture 64 and the bight 68 for use with the cable tie 34, an additional pair of apertures 82 in its rear panel 62 for use in mounting a pair of suction cups 84 on the rear panel 62 by means of flat-head mounting screws 86 or the like. To avoid interference between the screws 86 and a dispenser box (not shown in FIGS. 8 and 9) mounted in the shroud 80, the inside parts of the apertures 82 are countersunk when molded to receive the heads of the screws 86. In use, the cable tie 34 extending from a dispenser box can be extended through the aperture 64 and the cable tie 34 used to clamp the dispenser box to the shroud 80. Thus, when the suction cups 84 are used, the dispenser box cable 34 is used solely to clamp the dispenser box to the shroud 80. When a dispenser box is no longer useful, it may be disconnected from the shroud by cutting the cable tie and dispenser box removed from the shroud 80 and replaced by a fresh dispenser box. Moisture or condensate shields 88 are provided above all of the apertures 64 and 82 and also the bight 68. Shields 88 have an inverted V-shape to provide downwardly and outwardly sloping, rearwardly-projecting shoulders for guiding moisture away from the apertures 64, 82 and the bight 68.

The protective shields of both illustrated embodiments are molded in one piece but could be fabricated from more than one piece of plastic.

Although the presently preferred embodiments of this invention have been described, it will be understood that within the purview of the invention various changes may be made within the scope of the following claims.

We claim:

1. A coupon dispenser assembly comprising:
    a coupon dispenser comprising a cardboard box, a stack of coupons in said box, and a mounting member extending from said box, said box having a front end and a rear end, a front wall at said front end and a rear wall at said rear end, said front wall having a slot that provides access to said stack of coupons to enable manual removal of said coupons from said box, a top wall extending from said front wall to said rear wall, a bottom wall extending from said front wall to said rear wall, and a pair of side walls joined to each of said front wall, said rear wall, said top wall and said bottom wall; and a water-proof shroud having a self-supporting shape covering portions of said box to protect said box and the coupons from damage due to inclement weather, said shroud comprising a top panel covering said top wall of said box, and a pair of side panels joined to said top panel along respective opposite edges thereof, said side panels covering respective opposite sidewalls of said box.

2. The coupon dispenser assembly of claim 1 wherein said shroud further comprises a brim projecting forwardly from the front end of said top panel.

3. The coupon dispenser assembly of claim 2 wherein said brim projects upwardly from said top panel and forwardly and outwardly from the front ends of said side panels.

4. The coupon dispenser assembly of claim 1 wherein said shroud has a front panel covering said front wall of said box, said front panel having an opening that exposes said slot so that coupons can be removed from said box through said opening.

5. The coupon dispenser assembly of claim 4 wherein said front panel comprises an upper panel section joined to said top wall and to said sidewalls.

6. The coupon dispenser assembly of claim 5 wherein said front panel further comprises a lower panel section joined to said side panels, said opening in said front panel being defined by and between mutually confronting edges of said upper panel section and said lower panel section.

7. The coupon dispenser assembly of claim 6 wherein said shroud further comprises a brim projecting forwardly from the front end of said top panel.

8. The coupon dispenser assembly of claim 6 wherein said brim projects upwardly from said top panel and forwardly and outwardly from the front ends of said side panels.

9. The coupon dispenser assembly of claim 1 wherein said shroud has a rear panel having top and side edges joined respectively to said top panel and to said side panels.

10. The coupon dispenser assembly of claim 9 wherein said rear panel has an aperture through which said mounting member extends.

11. The coupon dispenser assembly of claim 10 wherein said rear panel has a bottom edge generally in the shape of an outwardly-flared inverted "V".

12. The coupon dispenser assembly of claim 11 wherein said mounting member comprises a cable tie having a first leg extending through said opening in said rear panel and a second leg engageable with said bottom edge.

13. The coupon dispenser assembly of claim 9 wherein said shroud further comprises a brim projecting forwardly from the front end of said top panel.

14. The coupon dispenser assembly of claim 13 wherein said brim projects upwardly from said top panel and forwardly and outwardly from the front ends of said side panels.

15. A protective shroud for a disposable coupon dispenser, said dispenser comprising a cardboard box, a stack of coupons in said box, and a mounting member for mounting said box onto a support, said shroud having a self-supporting shape and providing a water proof cover for said box, said shroud comprising plural thin-walled panels including a top panel which has front and rear ends, a pair of side panels which have front and rear ends joined to said top panel along respective opposite edges thereof, a rear panel having edges joined to edges of said top panel and said side panel, and a brim projecting forwardly from the front end of said top panel, upwardly from said top panel and forwardly and outwardly from the front ends of said side panels.

16. The shroud of claim 15 wherein said rear panel is apertured to permit a portion of said mounting member to be extended therethrough.

17. A protective shroud for a disposable coupon dispenser, said dispenser comprising a cardboard box, a stack of coupons in said box, and a mounting member for mounting said box onto a support, said shroud having a self-supporting shape and providing a water proof cover for said box, said shroud comprising plural thin-walled panels including a top panel which has front and rear ends, a pair of side panels which have front and rear ends joined to said top panel along respective opposite edges thereof, a rear panel having edges joined to edges of said top panel and said side panel, and a front panel having an opening that exposes a coupon slot in the front of the box so that coupons may be removed from said box through said opening, said front panel comprising an upper panel section joined to said top panel and to said side panels, said front panel further comprising a lower panel section joined to said side panels, said opening in said front panel being defined by and between mutually confronting edges of said upper panel section and said lower panel section.

18. The shroud of claim 17 wherein said shroud has a rear panel having top and side edges joined respectively to said top panel and to said side panels.

19. The shroud of claim 18 wherein said rear panel has an opening for receiving a cable tie extending from said box can extend.

20. The shroud of claim 19 wherein said rear panel has a bottom edge generally in the shape of an outwardly-flared inverted "V".

21. The shroud assembly of claim 19 wherein at least one suction cup is mounted on said rear panel.

22. The shroud of claim 19 wherein there are two suction cups mounted on said rear panel and said rear panel has an aperture through which said mounting member extends.

23. The shroud of claim 17 wherein said rear panel is apertured to permit a portion of said mounting member to be extended therethrough.

* * * * *